(12) United States Patent
Min

(10) Patent No.: US 9,043,110 B2
(45) Date of Patent: May 26, 2015

(54) ACTIVE CONTROL METHOD OF PEDAL EFFORT FOR ACCELERATOR

(71) Applicants: Hyundai Motor Company, Seoul (KR); Kia Motors Corporation, Seoul (KR)

(72) Inventor: Jeong Seon Min, Gwangju (KR)

(73) Assignees: HYUNDAI MOTOR COMPANY, Seoul (KR); KIA MOTORS CORP., Seoul (KR)

( * ) Notice: Subject to any disclaimer, the term of this patent is extended or adjusted under 35 U.S.C. 154(b) by 0 days.

(21) Appl. No.: 13/955,837

(22) Filed: Jul. 31, 2013

(65) Prior Publication Data
US 2014/0316648 A1 Oct. 23, 2014

(30) Foreign Application Priority Data
Apr. 23, 2013 (KR) .................. 10-2013-0044847

(51) Int. Cl.
| | |
|---|---|
| G06F 7/70 | (2006.01) |
| G05G 1/40 | (2008.04) |
| B60W 50/08 | (2012.01) |
| B60K 26/02 | (2006.01) |
| G05G 1/44 | (2008.04) |
| G05G 5/03 | (2008.04) |

(52) U.S. Cl.
CPC .............. G05G 1/40 (2013.01); B60W 50/08 (2013.01); B60K 26/021 (2013.01); G05G 1/44 (2013.01); G05G 5/03 (2013.01)

(58) Field of Classification Search
USPC .............................................. 701/36, 70, 99
See application file for complete search history.

(56) References Cited

U.S. PATENT DOCUMENTS

| | | | | |
|---|---|---|---|---|
| 2009/0018739 | A1* | 1/2009 | Ohmori et al. ................... | 701/70 |
| 2009/0043471 | A1* | 2/2009 | Ly .................... | 701/70 |
| 2010/0139444 | A1* | 6/2010 | Park ................ | 74/513 |
| 2011/0022286 | A1* | 1/2011 | Sato ............ | 701/99 |
| 2012/0285287 | A1* | 11/2012 | Sakaguchi et al. .............. | 74/513 |

FOREIGN PATENT DOCUMENTS

| | | |
|---|---|---|
| JP | 2004-017935 A | 1/2004 |
| JP | 2004-306690 A | 11/2004 |
| JP | 2005-174218 A | 6/2005 |
| JP | 2010-052721 A | 3/2010 |
| KR | 10-0402276 B1 | 10/2003 |
| KR | 10-2010-0063453 A | 6/2010 |
| KR | 10-2012-0060067 A | 6/2012 |

OTHER PUBLICATIONS

Korean Notice of Allowance issued in Korean Application No. 10-2013-0044847 dated Oct. 27, 2014.

* cited by examiner

*Primary Examiner* — Hussein A. Elchanti
(74) *Attorney, Agent, or Firm* — McDermott Will & Emery LLP

(57) ABSTRACT

An active control method of pedal effort for an accelerator comprises steps to actively vary pedal effort. When a vehicle having a controllable pedal effort accelerator pedal runs, the active control method can actively vary the accelerator pedal effort according to accelerator pedal manipulation habits of a driver, thereby improving the accelerator pedal manipulation efficiency of the driver.

7 Claims, 7 Drawing Sheets

ACTIVE CONTROL METHOD OF PEDAL EFFORT FOR ACCELERATOR

CROSS-REFERENCE TO RELATED APPLICATION

This application claims under 35 U.S.C. §119(a) the benefit of Korean Patent Application No. 10-2013-0044847 filed on Apr. 23, 2013, the entire contents of which are incorporated herein by reference.

TECHNICAL FIELD

The present disclosure relates, in general, to an active control method of pedal effort for an accelerator and, more particularly, to an active control method of pedal effort for an accelerator which can actively vary the accelerator pedal effort of a vehicle according to accelerator pedal manipulation habits of a driver when the vehicle is being driven, thereby improving the accelerator pedal manipulation efficiency of the driver.

BACKGROUND

FIG. 1 illustrates an organ type of accelerator pedal, as an example of related art vehicle accelerator pedals. The related art accelerator pedal includes a pedal arm housing 1 securely mounted to a frame panel placed below a driver's seat, and a pedal arm 2 with one end rotatably connected to the pedal arm housing 1. A pedal bracket 3 is securely mounted to a floor panel placed below the driver's seat, and a pedal pad 4 with one end is rotatably connected to the pedal bracket 3 and coupled to the pedal arm 2 by ball joint coupling. A spring plate 5 is combined with an end of the pedal arm 2 that is placed in the pedal arm housing 1. A first end of the spring 6 is held by the spring plate 5, and a second end of the spring 6 is held by the pedal arm housing 1.

When the pedal arm 2, according to the related art accelerator pedal, is rotated around a hinge shaft 7, the spring 6 is elastically compressed and forms a pedal effort of the pedal pad 4.

However, the above-mentioned related art accelerator pedal uses a spring having a predetermined elastic modulus as the spring 6 to meet the safety laws and regulations, and thus changing the pedal effort of the related art accelerator pedal is impossible. Further, in the related art accelerator pedal, the accelerator pedal effort of a vehicle according to the accelerator pedal manipulation habits of a driver cannot be varied when the vehicle is being driven, thus inconveniencing the driver.

The foregoing is intended merely to aid in the understanding of the background of the present disclosure, and should not be construed as being included in the related art known by those skilled in the art.

SUMMARY

The present disclosure has been made to solve the above problems in the related art and is intended to propose an active control method of pedal effort for an accelerator. When a driver drives a vehicle having a controllable accelerator pedal effort, the active control method actively varies the accelerator pedal effort according to accelerator pedal manipulation habits of the driver, thereby improving the accelerator pedal manipulation efficiency of the driver.

According to an aspect of the present disclosure, an active control method of pedal effort for an accelerator includes a data storing step of storing accelerator position sensor (APS) operation percentages information data at predetermined time interval while driving a vehicle having a controllable pedal effort accelerator. A manipulation habit change determination step determines whether present accelerator pedal manipulation habit of a driver has changed from previous accelerator pedal manipulation habit of the driver when driving the vehicle previously by comparing the present accelerator pedal manipulation habit to the previous accelerator pedal manipulation habit based on the stored information data. A pedal effort control step determines a present accelerator pedal effort control value based on results of the manipulation habit change determination step and controls a present accelerator pedal effort of the vehicle being driven, using the determined present accelerator pedal effort control value.

At the manipulation habit change determination step, whether the accelerator pedal manipulation habit of the driver has changed or not may be determined by calculating a gradient of a present APS operation percentage and a gradient of a previous APS operation percentage as a function of time, and by comparing the gradients of the present and previous APS operation percentages. A change in a gradient variation rate of the APS operation percentage is determined by determining the variation in the gradient of the present APS operation percentage from the gradient of the previous APS operation percentage.

If there is no change between the gradient of the previous APS operation percentage and the gradient of the present APS operation percentage, or there is no change in the accelerator pedal manipulation habit of the driver, the present accelerator pedal effort may be maintained at a most recent previous pedal effort.

When the gradient of the present APS operation percentage has been increased from the gradient of the previous APS operation percentage or the accelerator pedal manipulation habit of the driver has become more vigorous, the present accelerator pedal effort may be reduced to a preset target pedal effort.

Further, when the gradient of the present APS operation percentage has been reduced from the gradient of the previous APS operation percentage, or when the accelerator pedal manipulation habit of the driver has been attenuated, the present accelerator pedal effort may be increased to a preset target pedal effort.

The active control method of pedal effort for an accelerator may further includes a pedal effort control system checking step of determining whether a pedal effort control system is in a normal state when the vehicle starts, prior to the data storing step.

If the pedal effort control system is in the normal state, the data storing step may be performed. If the pedal effort control system is in an abnormal state, the present accelerator pedal effort may be reset to an initial pedal effort.

When a battery voltage signal represents a normal state of a battery, no signal requiring an initialization of the present accelerator pedal effort against an abnormal state has been output, and a signal representing a pedal effort active control mode has been generated, the pedal effort control system may be in the normal state.

As described above, the active control method of pedal effort for an accelerator according to the present disclosure has advantages. When a vehicle having controllable pedal effort accelerator is driven, the active control method can actively vary the accelerator pedal effort according to accelerator pedal manipulation habits of the driver, thereby improving the accelerator pedal manipulation efficiency of the driver.

BRIEF DESCRIPTION OF THE DRAWINGS

The above and other objects, features, and other advantages of the present disclosure will be more clearly understood from the following detailed description.

DETAILED DESCRIPTION

Figure 1:
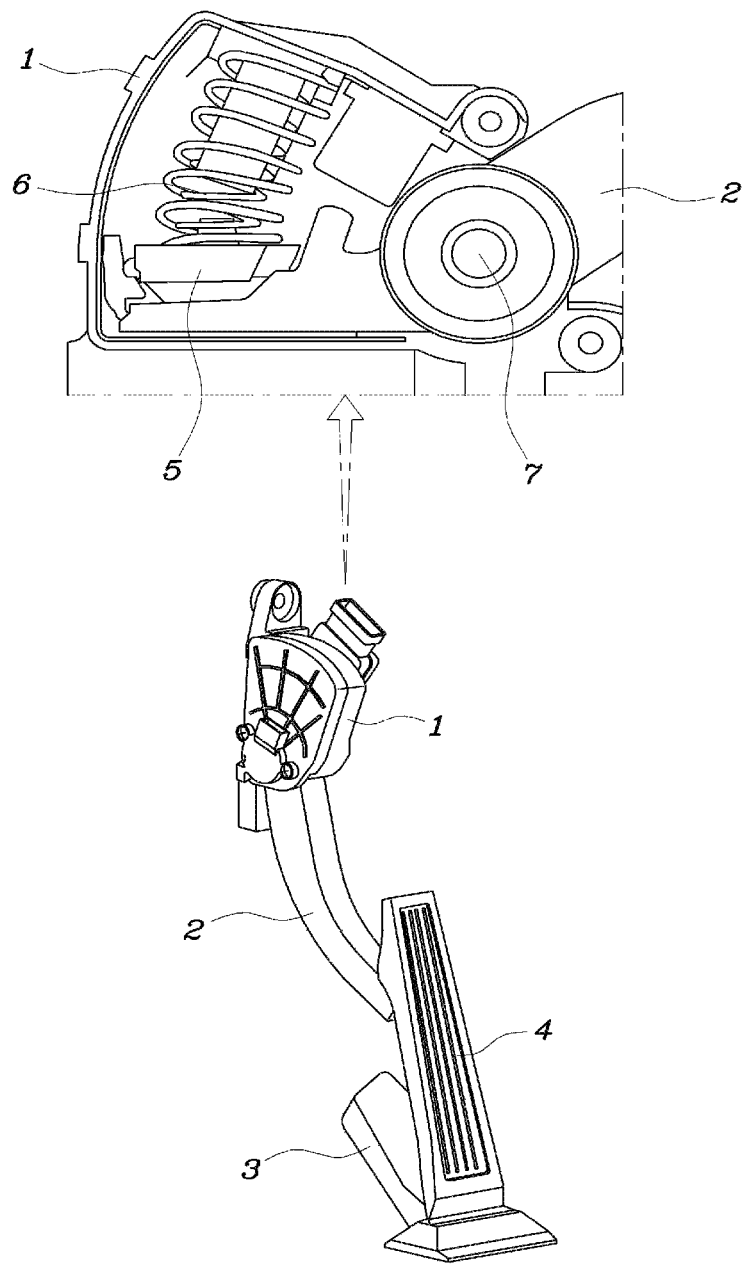
FIG. 1 is a view illustrating the related art accelerator pedal without a pedal effort control function.
Figure 2:
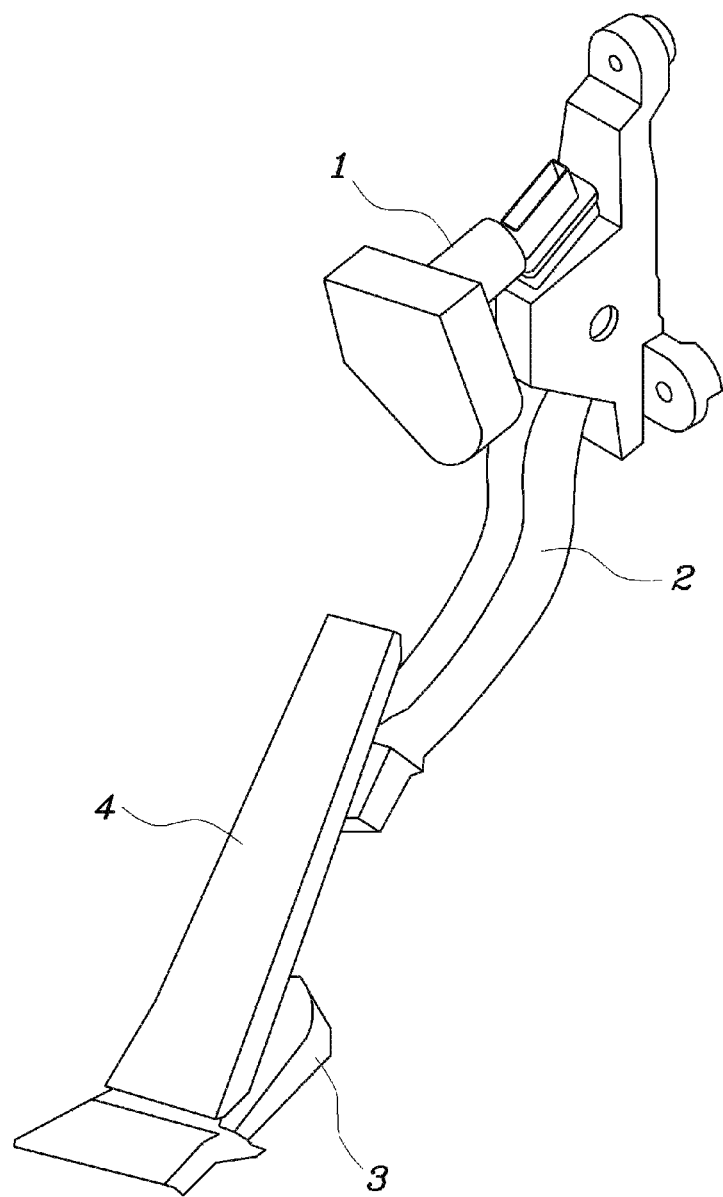
FIGS. 2 through 5 are views illustrating an accelerator pedal having a pedal effort control function.

Hereinbelow, a preferred embodiment of the present disclosure will be described in detail with reference to the accompanying drawings.

Referring to FIGS. 2 through 5, a vehicle accelerator pedal having a pedal effort control function includes a pedal arm housing 1 securely mounted to a frame panel placed below a driver's seat, and a pedal arm 2 with one end rotatably connected to the pedal arm housing 1. The vehicle accelerator pedal further includes a pedal bracket 3 securely mounted to a floor panel placed below the driver's seat, and a pedal pad 4 with one end rotatably connected to the pedal bracket 3 and coupled to the pedal arm 2 by ball joint coupling.

A spring plate 5 is combined with an end of the pedal arm 2 placed in the pedal arm housing 1. The pedal arm 2 can be rotated around a hinge shaft 7 relative to the pedal arm housing 1.

The accelerator pedal includes a pedal effort control module 10. The pedal effort control module 10 includes a first end of a spring 11 held by an end of the pedal arm 2 which is disposed in the pedal arm housing 1. A spring support block 12 supports a second end of the spring 11. A motor 13 is securely installed in the pedal arm housing 1 A power transmitter 14 transmits the output power of the motor 13 to the spring support block 12, thereby moving the spring support block 12 so as to vary the length of the spring 11.

Figure 3:
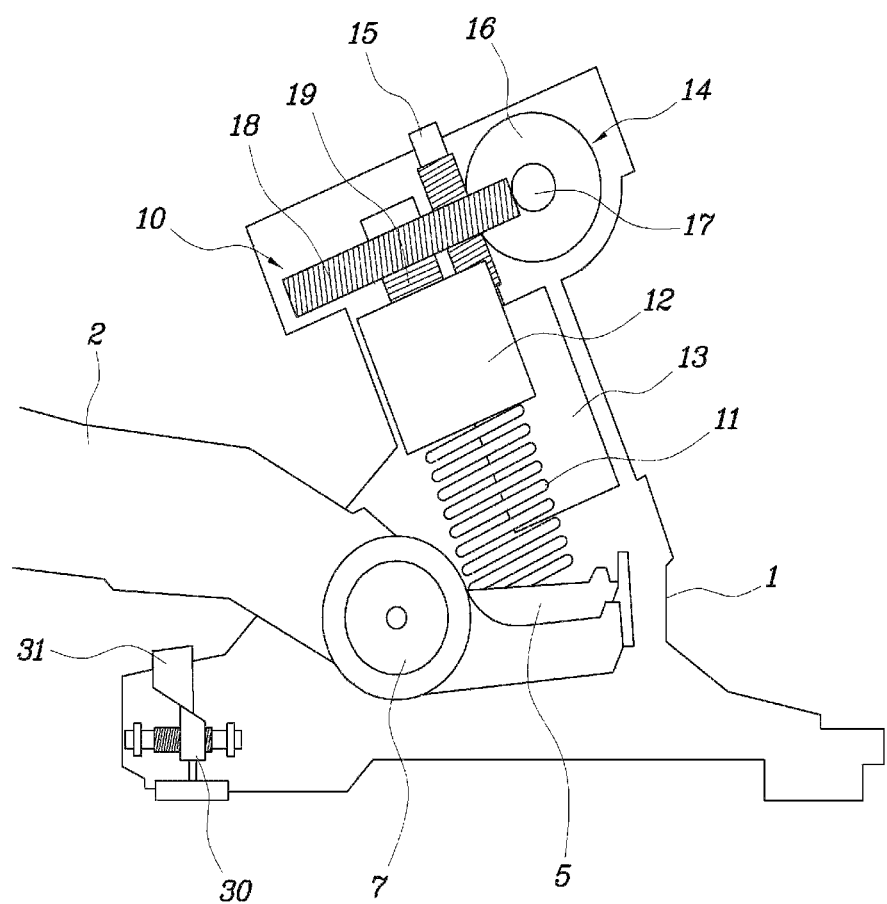
Figure 4:
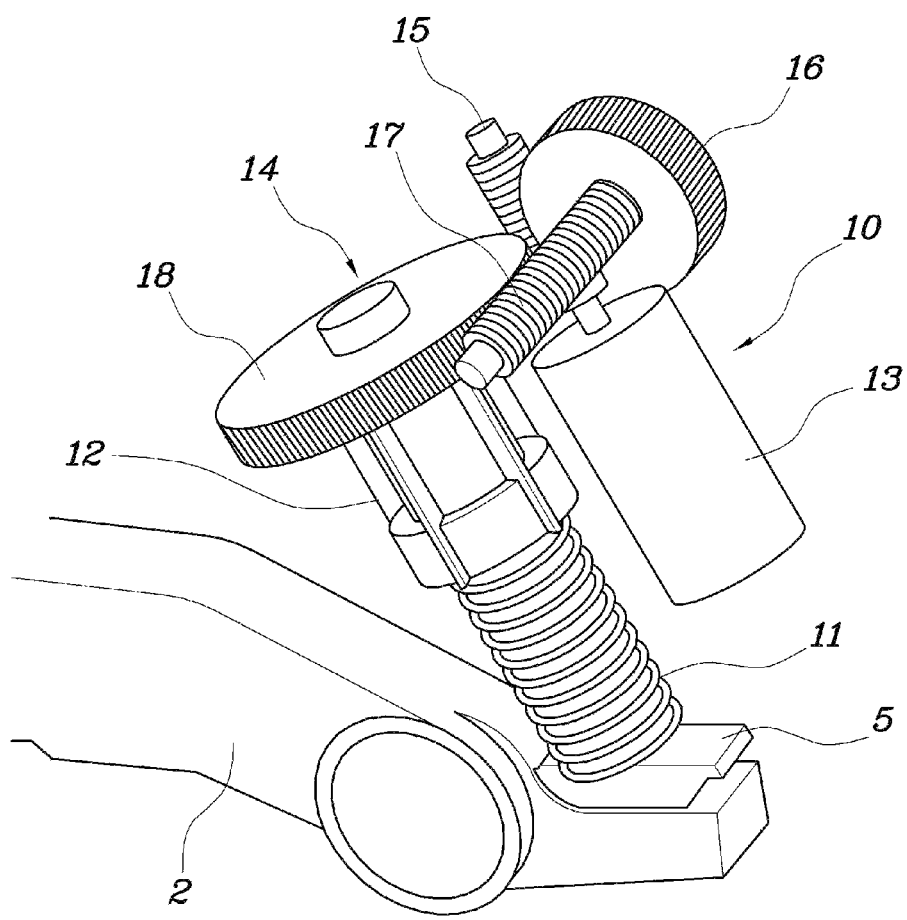
Figure 5:
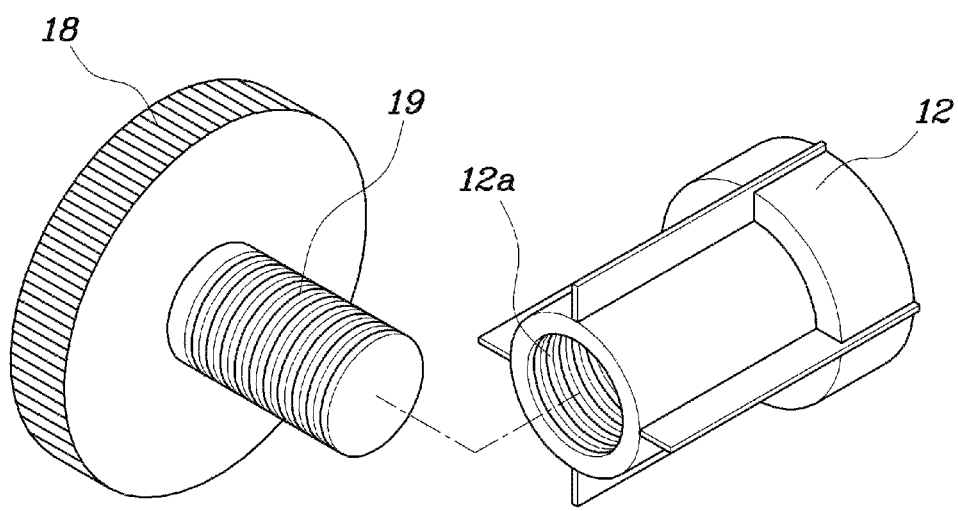

The spring 11 may be directly held on the end of the pedal arm 2. Referring to FIGS. 3 and 4, the spring plate 5 is coupled to the end of the pedal arm 2 in the pedal arm housing 1, and the lower end of the spring 11 is held on the spring plate 5. Accordingly, when the pedal arm 2 is rotated around the central axis of the hinge shaft 7, the spring 11 is elastically compressed at a portion between the spring plate 5 and the spring support block 12. The elastic compression of the spring 11 is transmitted to the pedal pad 4 through the pedal arm 2 and forms pedal effort in the pedal pad 4.

To transmit the output power of the motor 13 to the spring support block 12, the power transmitter 14 connects the motor 13 to the spring support block 12. The power transmitter 14 includes a first worm gear 15 integrated with an output shaft of the motor 13 A first worm wheel gear 16 is rotatably engaged with the first worm gear 15, a second worm gear 17 is integrated with the center of the first worm wheel gear 16. A second worm wheel gear 18 is rotatably engaged with the second worm gear 17. A gear bolt 19 is integrally formed on the center of the second worm wheel gear 16, protruding from the center of the second worm wheel gear 16 with threads formed around the outer circumferential surface of the gear bolt 19.

Further, the spring support block 12 has a locking hole 12a with threads formed around the inner circumferential surface of the locking hole 12a, engaging the locking hole 12a with the gear bolt 19. When the second worm wheel gear 18 rotates, the spring support block 12 may rectilinearly move along the gear bolt 19, and the length of the spring 11 may be changed by the rectilinear movement of the spring support block 12, thereby varying the pedal effort.

The operation is automatically controlled by a controller (not shown) with the motor 13 according to vehicle running conditions, driver's physical conditions, driving habits of a driver, a selected gear shift stage, etc.

When an accelerator pedal having controllable pedal effort is installed in a vehicle, the accelerator pedal effort can be actively varied according to accelerator pedal manipulation habits of the driver, thereby improving the accelerator pedal manipulation efficiency of the driver.

That is, when the vehicle is driven by a driver having a habit of quickly manipulating the accelerator pedal, the pedal effort control module 10 reduces the pedal effort of the accelerator pedal so as to allow the driver to manipulate the accelerator pedal quickly, thereby improving the accelerator pedal manipulation efficiency of the driver. On the contrary, when the vehicle is driven by a driver having a habit of slowly manipulating the accelerator pedal, the pedal effort control module 10 increases the accelerator pedal effort, thereby preventing quick manipulation of the accelerator pedal.

Figure 6:
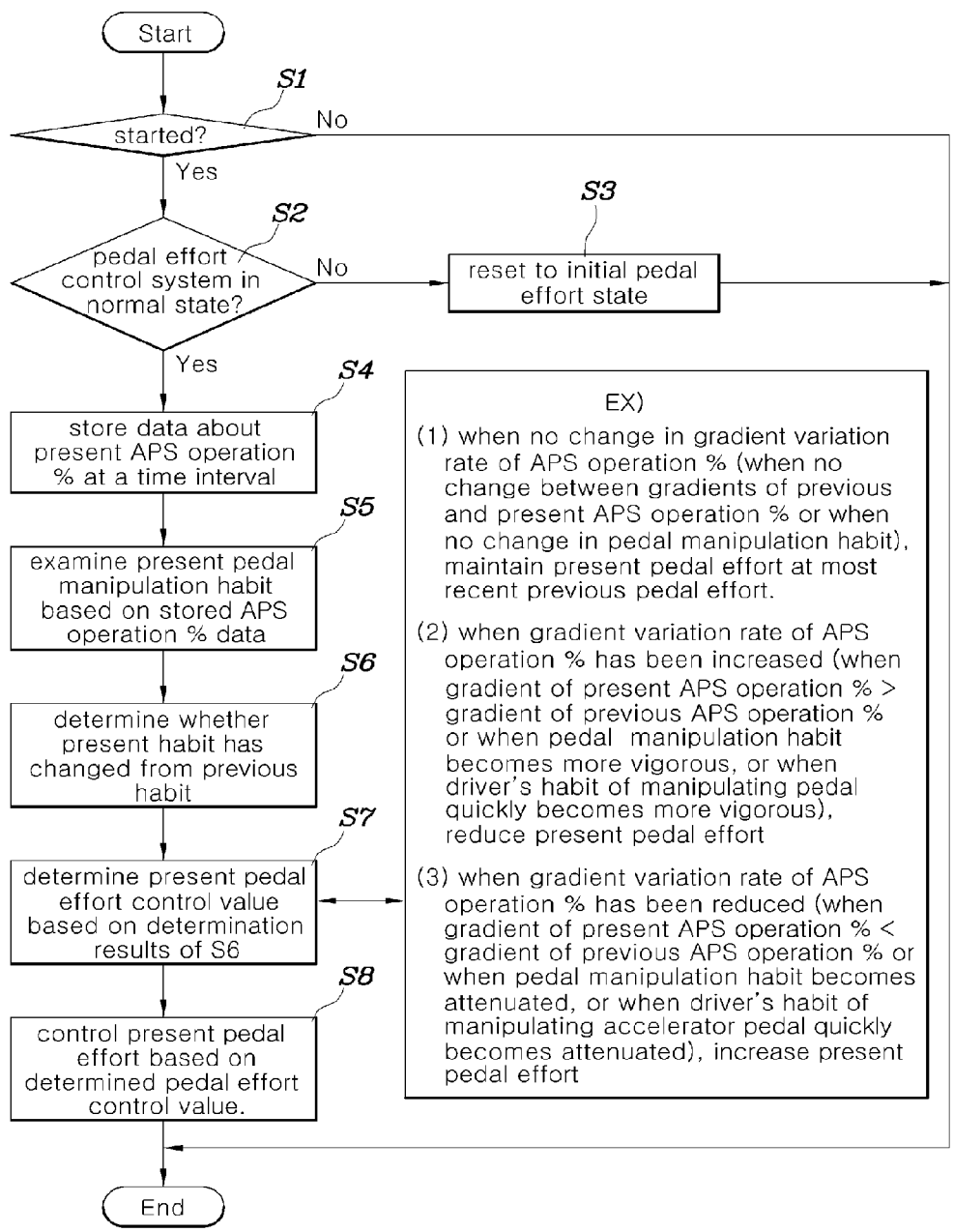
FIG. 6 is a flowchart illustrating a method of actively controlling the pedal effort of the accelerator pedal having the pedal effort control function according to the present disclosure.
Figure 7:
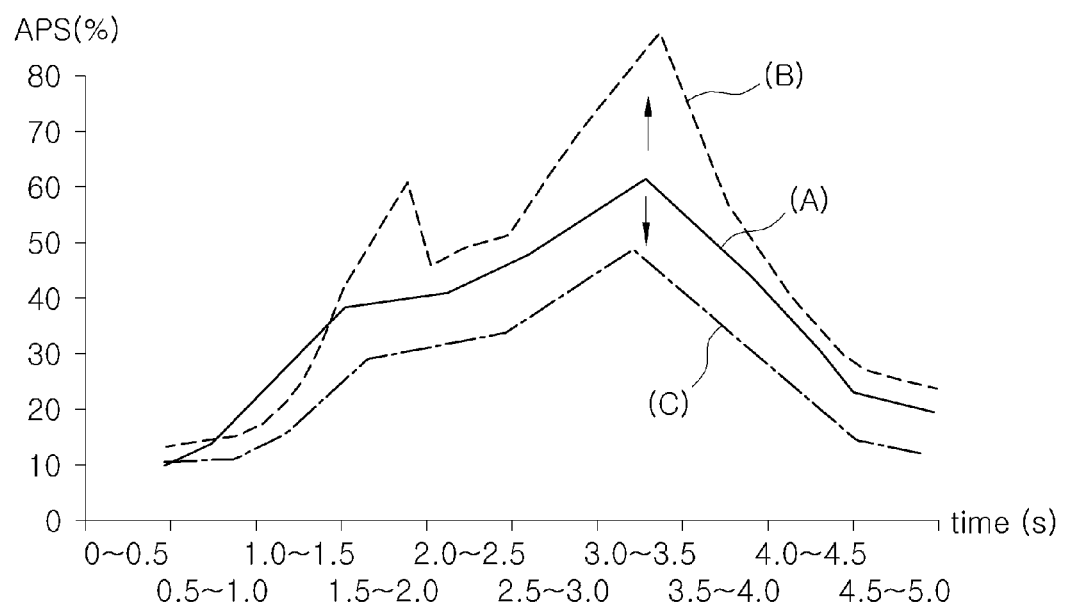
FIG. 7 is a graphic diagram illustrating gradient variation rates of APS operation percentages.

Referring to FIGS. 6 and 7, the active control method of pedal effort for an accelerator comprises a pedal effort control system checking step of determining whether a pedal effort control system is in a normal state when a vehicle having the controllable pedal effort accelerator starts. A data storing step stores information about present operation percentages of an Accelerator Position Sensor (APS) at a predetermined time interval when a driver drives the vehicle. A manipulation habit change determination step determines whether the driver's accelerator pedal manipulation habit has changed or not by comparing a present accelerator pedal manipulation habit to previous accelerator pedal manipulation habit. A pedal effort control step determines a present accelerator pedal effort control value of the vehicle being driven based on results of the manipulation habit change determination step and controls present accelerator pedal effort using the determined pedal effort control value.

The data storing step performs when the pedal effort control system is in the normal state at the pedal effort control system checking step. Here, only when a battery voltage signal represents a normal state of a battery, and no signal requiring an initialization of the present accelerator pedal effort against an abnormal state has been output, and a signal representing a pedal effort active control mode has been generated, the pedal effort system is determined to be in the normal state.

Further, when the pedal effort control system is in an abnormal state at the pedal effort control system checking step, the present accelerator pedal effort is reset to an initial pedal effort.

Here, the initial pedal effort state means a reset state of the pedal effort.

Whether the accelerator pedal manipulation habit of the driver has changed or not is determined at the manipulation habit change determination step by a process in which both the gradient of the present APS operation percentage and the gradient of the previous APS operation percentage as a function of time are calculated, and the gradients of the present and previous APS operation percentages are compared to each other so as to determine a change in the gradient variation rate of the APS operation percentage by determining a variation in the gradient of the present APS operation percentage from the gradient of the previous APS operation percentage.

That is, at the manipulation habit change determination step, if there is no change in the gradient variation rate of the APS operation percentage (this means that if there is no change between the gradient of the previous APS operation percentage and the gradient of the present APS operation percentage, or that there is no change in the accelerator pedal manipulation habit of the driver, as shown by curve A in FIG. 7), the present accelerator pedal effort at the pedal effort control step is maintained at the most recent previous pedal effort.

Further, at the manipulation habit change determination step, if the gradient variation rate of the APS operation percentage has been increased (this means that if the gradient of the present APS operation percentage has been increased from the gradient of the previous APS operation percentage by the driver's habit of manipulating the accelerator pedal has become more vigorous, or the driver's habit of quickly manipulating the accelerator pedal has become more vigorous, as shown by the curve B in FIG. 7), the present accelerator pedal effort at the pedal effort control step is reduced to a preset target pedal effort.

Moreover, when the gradient variation rate of the APS operation percentage has been reduced (this means that when the gradient of the present APS operation percentage has been reduced from the gradient of the previous APS operation percentage, that the driver's habit of manipulating the accelerator pedal has been attenuated, or that the driver's habit of quickly manipulating the accelerator pedal has been attenuated, as shown by the curve C in FIG. 7), the present accelerator pedal effort at the pedal effort control step is increased to the preset target pedal effort.

Hereinbelow, the operation of an embodiment of the present disclosure will be described. First, the operation of controlling the pedal effort will be described.

Referring to FIG. 3, when the motor 13 is operated under the control of the controller, and the output power of the motor 13 is transmitted to the spring support block 12 through the worm gears 15 and 17, the worm wheel gears 16 and 18, and the gear bolt 19, the spring support block 12 moves upward or downward along the gear bolt 19 from a position.

When the spring support block 12 moves upward along the gear bolt 19 (in a direction far from the spring plate), the spring 11 is elastically tensioned by the restoring force, thereby increasing the length of the spring 11. In the above state, the spring force acting on the pedal arm 2 is reduced, and so is the accelerator pedal effort.

On the contrary, when the spring support block 12 moves downward along the gear bolt 19 (in a direction close to the spring plate), the spring 11 is elastically compressed, thereby reducing the length of the spring 11. In the above state, the spring force that acts on the pedal arm 2 is increased, and so is the accelerator pedal effort.

The motor 13 is automatically operated under the control of the controller (not shown). For example, during a process of driving a vehicle, when the accelerator pedal manipulation habit of a driver has changed to a habit of quickly manipulating the accelerator pedal, the motor automatically controls the accelerator pedal effort so as to reduce the accelerator pedal effort. On the contrary, when the accelerator pedal manipulation habit of the driver has changed to a habit of slowly manipulating the accelerator pedal, the motor is automatically controls the accelerator pedal effort so as to increase the accelerator pedal effort.

When the driver drives the vehicle at a low speed, for example, on a congested street in the city, the pedal effort is reduced, thereby reducing the fatigue of the driver due to repeated pedal manipulation. However, when the driver drives the vehicle at a high speed, for example, on an express highway, the pedal effort is increased, thereby supporting the pedal under a constant pressure and reducing the fatigue in a driver's ankle.

When driving uphill, the pedal effort is reduced so as to increase a pedal manipulation amount. When driving downhill, the pedal effort is increased so as to reduce the pedal manipulation amount.

Further, when the vehicle is driven at a high speed or is driven in a safety mode, the pedal effort is increased so as to allow a driver to safely drive the vehicle. The pedal effort can be appropriately controlled in consideration of age, sex, and physical conditions of the driver.

Hereinbelow, the method of actively varying the accelerator pedal effort according to the accelerator pedal manipulation habit of a driver when the driver drives a vehicle having the controllable pedal effort accelerator will be described in detail with reference to FIG. 6.

When the vehicle starts (step S1), the controller determines whether the pedal effort control system is in a normal state or not (step S2). The controller determines at step S2 that the pedal effort control system is in the normal state if a battery voltage signal represents a normal state of a battery, no signal has been output to require an initialization of the present accelerator pedal effort against an abnormal state, and a signal representing a pedal effort active control mode has been generated. The pedal effort control system is in the normal state when the battery voltage signal is 9V to 16.5V at step S2. The present accelerator pedal effort is reset to an initial pedal effort state (step S3) if the pedal effort control system is in an abnormal state.

The present APS operation percentages information data is stored at a predetermined time interval (step S4) when the pedal effort control system is in the normal state, Thereafter, a present accelerator pedal manipulation habit of the driver is determined based on the stored APS operation percentages information data (step S5). The control unit further determines whether the present accelerator pedal manipulation habit of the driver at present has been changed from a previous accelerator pedal manipulation habit of the driver (step S6).

Both the gradient of the present APS operation percentage and the gradient of the previous APS operation percentage as a function of time are calculated and compared to each other. By determining a variation in the gradient of the present APS operation percentage from the gradient of the previous APS operation percentage, a change in the gradient variation rate of the APS operation percentage is determined.

Based on the results of step S6, the control unit determines a present accelerator pedal effort control value (step S7). The control unit controls the operation of the motor 13 based on the determined pedal effort control value, thereby controlling the present accelerator pedal effort of the vehicle (step S8).

The process of controlling the accelerator pedal effort is performed by three types of processes. When there is no change in the gradient variation rate of the APS operation percentage (this means that when there is no change between the gradient of the previous APS operation percentage and the gradient of the present APS operation percentage, or there is no change in the accelerator pedal manipulation habit of the driver, as shown by the curve A in FIG. 7), the present accelerator pedal effort of the vehicle is maintained at the most recent previous pedal effort, thereby the driver can stably manipulate the accelerator pedal.

When the gradient variation rate of the APS operation percentage has been increased (this means that when the gradient of the present APS operation percentage has been increased from the gradient of the previous APS operation percentage, that the driver's habit of manipulating the accelerator pedal has become more vigorous, or the driver's habit of quickly manipulating the accelerator pedal has become more vigorous, as shown by the curve B in FIG. 7), the present accelerator pedal effort of the vehicle being driven is reduced to a preset target pedal effort, thereby the driver can manipulate the accelerator pedal easily and quickly.

Finally, when the gradient variation rate of the APS operation percentage has been reduced (this means that when the gradient of the present APS operation percentage has been reduced from the gradient of the previous APS operation percentage, that the driver's habit of manipulating the accelerator pedal has been attenuated, or that the driver's habit of quickly manipulating the accelerator pedal has been attenuated, as shown by the curve C in FIG. 7), the present accelerator pedal effort of the vehicle being driven is increased to the preset target pedal effort. The present disclosure prevents a quick manipulation of the accelerator pedal, thereby improving safety when driving the vehicle.

The driver can easily manipulate the accelerator pedal and can efficiently prevent an undesired quick start of the vehicle when the control method of the present disclosure actively varies the accelerator pedal effort of the vehicle according to the accelerator pedal manipulation habits of the driver.

As described above, the active control method of pedal effort for an accelerator has advantages. The length of the spring 11 can be controlled by moving the spring support block 12 in response to an operation of the motor 13 without changing parts of an accelerator pedal with new parts. The present disclosure can easily vary the pedal effort as desired, and can efficiently meet the safety law and regulations of the accelerator pedal effort for any kind of vehicle.

Further, in the present disclosure, the accelerator pedal effort can be actively controlled according to the accelerator pedal manipulation habits of a driver, and thereby the driver can easily and efficiently manipulate the accelerator pedal.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. An active control method of pedal effort for an accelerator, comprising:
    a data storing step of storing Accelerator Position Sensor (APS) operation percentages information data at a predetermined time interval while a vehicle having a controllable pedal effort accelerator pedal is being driven;
    a manipulation habit change determination step of determining whether a present accelerator pedal manipulation habit of a driver when driving the vehicle has changed from a previous accelerator pedal manipulation habit of the driver when driving the vehicle previously by comparing the present accelerator pedal manipulation habit to the previous accelerator pedal manipulation habit based on the stored information data; and
    a pedal effort control step of determining a present accelerator pedal effort control value based on results of the manipulation habit change determination step, and controlling a present accelerator pedal effort of the vehicle being driven using the determined present accelerator pedal effort control value,
    wherein, at the manipulation habit change determination step, whether the accelerator pedal manipulation habit of the driver has changed or not is determined by calculating a gradient of a present APS operation percentage and a gradient of a previous APS operation percentage as a function of time and by comparing the gradients of the present and previous APS operation percentages to each other to determine a change in a gradient variation rate of the APS operation percentage by determining a variation in the gradient of the present APS operation percentage from the gradient of the previous APS operation percentage.

2. The active control method of pedal effort for an accelerator as set forth in claim 1, wherein, when there is no change between the gradient of the previous APS operation percentage and the gradient of the present APS operation percentage, or when there is no change in the accelerator pedal manipulation habit of the driver, at the manipulation habit change determination step, the present accelerator pedal effort of the vehicle being driven is controlled at the pedal effort control step and maintained at a most recent previous pedal effort.

3. The active control method of pedal effort for an accelerator as set forth in claim 1, wherein, when the gradient of the present APS operation percentage is increased from the gradient of the previous APS operation percentage, or when the accelerator pedal manipulation habit of the driver become more vigorous, at the manipulation habit change determination step, the present accelerator pedal effort of the vehicle is controlled at the pedal effort control step and reduced to a preset target pedal effort.

4. The active control method of pedal effort for an accelerator as set forth in claim 1, wherein, when the gradient of the present APS operation percentage has been reduced from the gradient of the previous APS operation percentage, or when the accelerator pedal manipulation habit of the driver has been attenuated, at the manipulation habit change determination step, the present accelerator pedal effort of the vehicle is increased to a preset target pedal effort at the pedal effort control step.

5. The active control method of pedal effort for an accelerator as set forth in claim 1, further comprising:
    a pedal effort control system checking step of determining whether a pedal effort control system is in a normal state when the vehicle starts, prior to the data storing step.

6. The active control method of pedal effort for an accelerator as set forth in claim 5, wherein, when the pedal effort control system is in the normal state at the pedal effort control system checking step, the data storing step is performed, and when the pedal effort control system is in an abnormal state, the present accelerator pedal effort is reset to an initial pedal effort.

7. The active control method of pedal effort for an accelerator as set forth in claim 5, wherein, when a battery voltage signal represents a normal state of a battery, no signal requiring an initialization of the present accelerator pedal effort against an abnormal state has been output, and a signal representing a pedal effort active control mode has been generated, the pedal effort control system is determined to be in the normal state at the pedal effort control system checking step.

* * * * *